Feb. 21, 1967 M. J. TERHO 3,305,115
LOADING DEVICE IN SELFLOADING
TRANSPORT VEHICLES FOR WASTE
Filed March 31, 1965 4 Sheets-Sheet 3
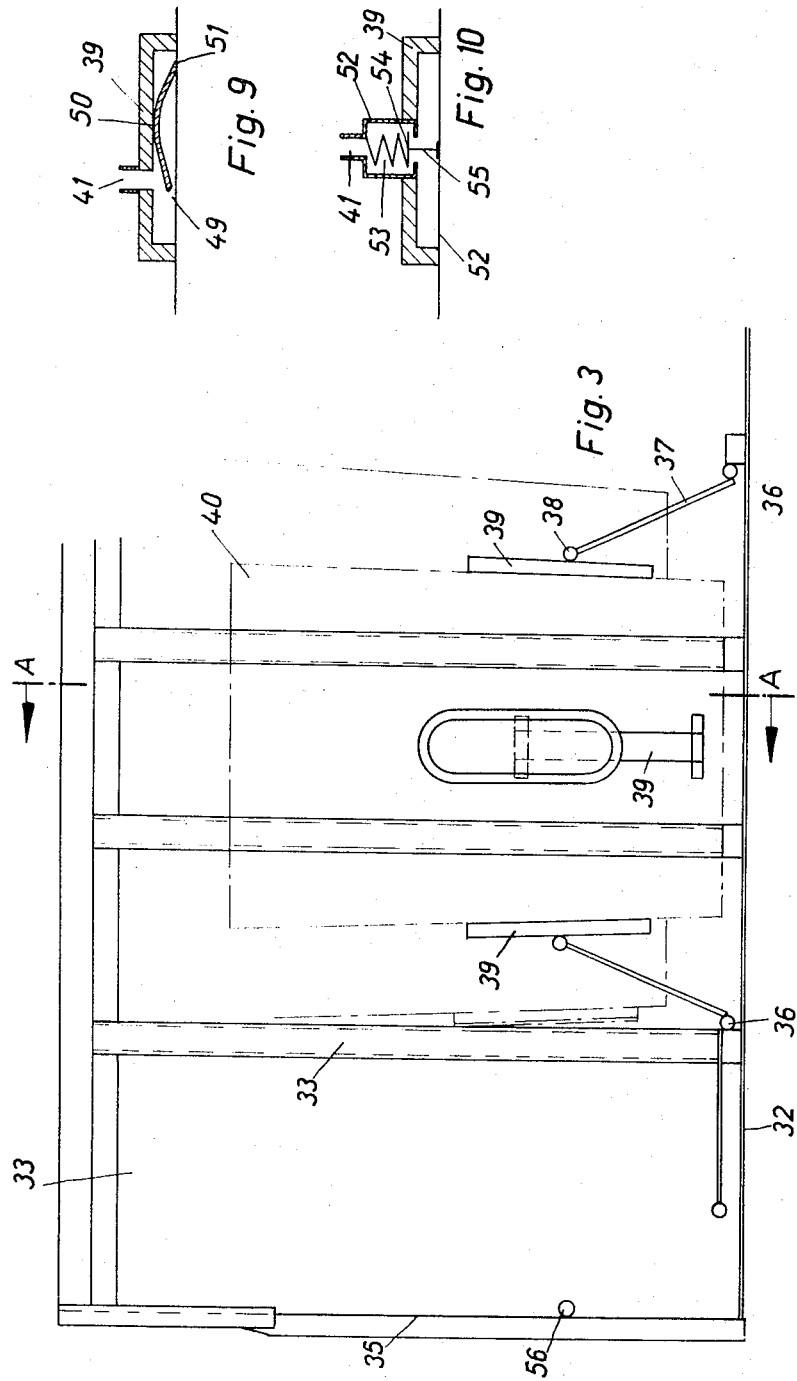
Inventor:
MIKKO JOOSEPPI TERHO

Feb. 21, 1967
M. J. TERHO
3,305,115
LOADING DEVICE IN SELFLOADING
TRANSPORT VEHICLES FOR WASTE
Filed March 31, 1965
4 Sheets-Sheet 4
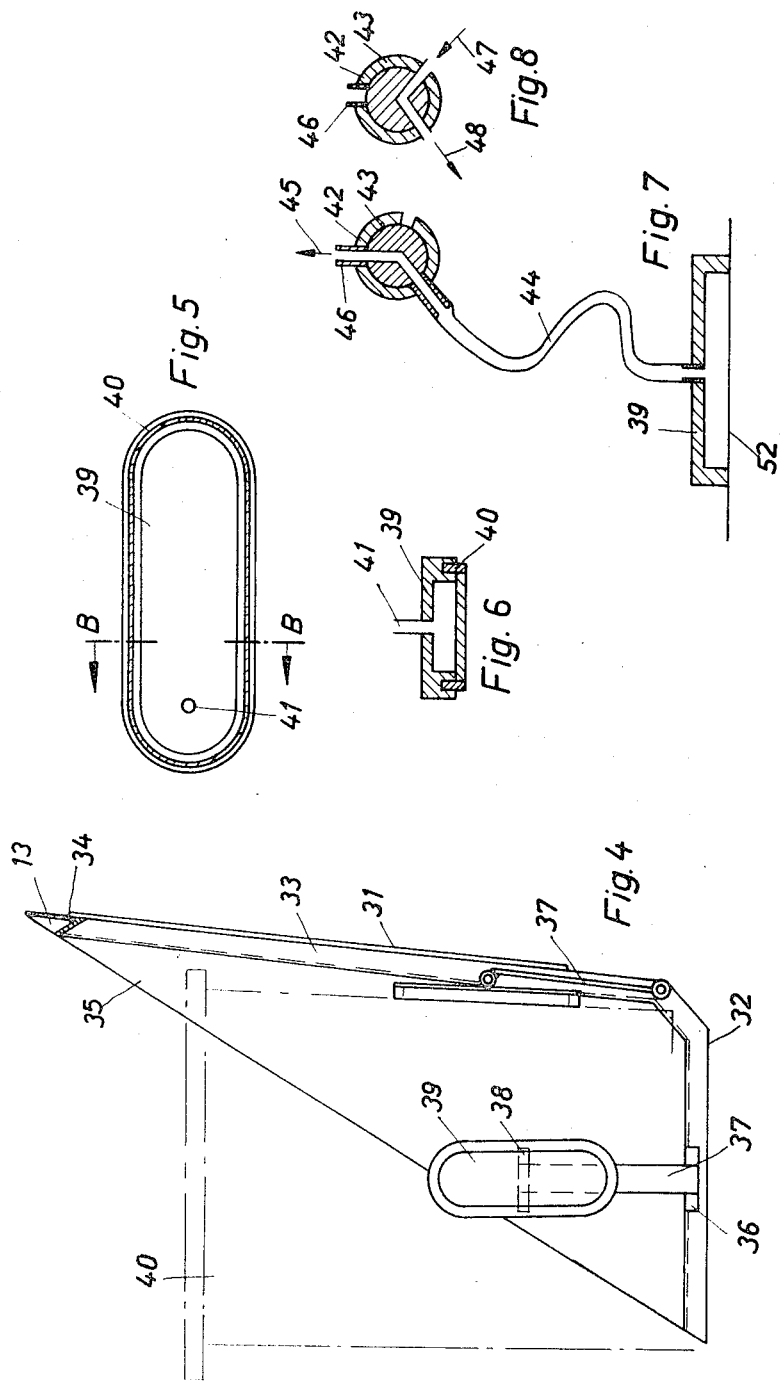
Inventor:
MIKKO TOOSEPPI TERHO

United States Patent Office 3,305,115
Patented Feb. 21, 1967

3,305,115
LOADING DEVICE IN SELFLOADING
TRANSPORT VEHICLES FOR WASTE
Mikko Jooseppi Terho, Autolava Oy, Raisio, Finland
Filed Mar. 31, 1965, Ser. No. 444,129
7 Claims. (Cl. 214—302)

These days a more economic, faster and more hygienic way of removing refuse is sought. Endeavours are made to compress the rubbish into a small space in the rubbish container or tank of the appropriate transport vehicle by means of special devices. This is done so that the efficiency of transport can be raised considerably over that of the ordinary transport vehicle. When loading is done automatically, a lesser number of men is required for the vehicle and the loading time is shorter. This form of transportation has the advantage of being hygienic since odors and the possibility of rubbish flying about is eliminated.

Waste cans located in the yards or waste depositories of apartment houses are placed in the scoop or dipper-shaped loading device of the waste-carrying transport vehicle and are attached by means of various kinds of clamps secured by screws or similar adjustable fastening means. Thereafter the loading scoop or dipper is swung by means of hydraulic power devices, so that the waste cans are elevated and at the same time are turned upside down or substantially so to dump the waste into a funnel-like space at the rear end of the transport vehicle from which it is fed by compression into the main portion of the motor vehicle. The arrangement of this kind that is presently in use has certain disadvantages and particularly since the attachment of cans is time consuming and is not always reliable. The present invention seeks to eliminate these disadvantages.

In the accompanying drawings, wherein embodiments of the invention are disclosed, FIG. 1 is a side elevational view of a transport vehicle for waste and constructed in accordance with the invention;

FIG. 3 shows from the rear a portion of a loading dipper or scoop including the can-attaching devices;

FIG. 4 is a sectional view taken on the line A—A, looking in the direction of the arrows;

FIG. 5 shows a suction cup as seen from below;

FIG. 6 is a sectional view taken on the line B—B of FIG. 5, looking in the direction of the arrows;

FIG. 7 is a schematic drawing of the suction cup including the connected flexible tube and valve;

FIG. 8 shows the valve of FIG. 7 set in a different position; and

FIGS. 9 and 10 show modified devices for connection to the suction cup.

Figure 1:
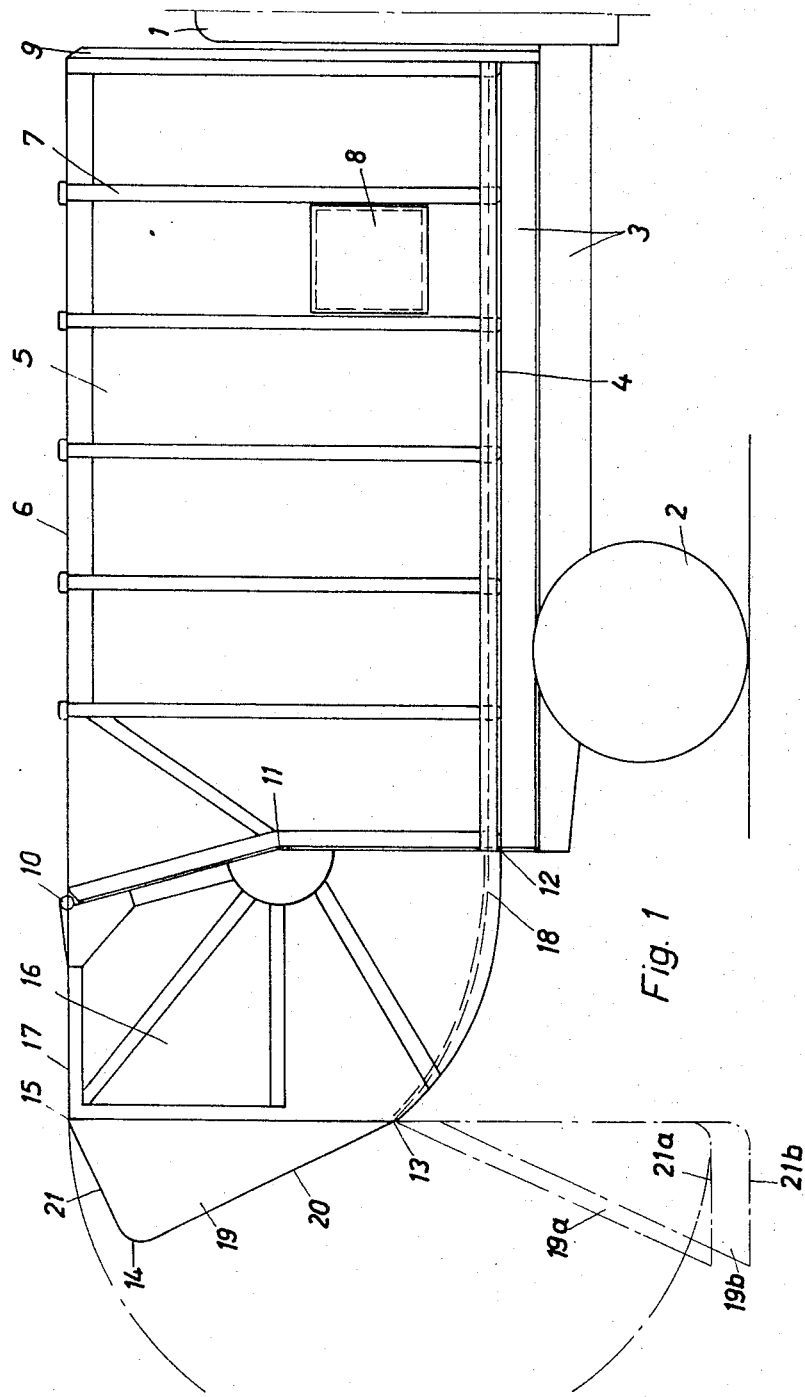

In FIG. 1, a portion of the body of the vehicle close to the rear wall of the driver's cab is indicated at 1. The rear wheels are indicated at 2, the side rails at 3. The rubbish container or collection tank built on the frame includes a bottom 4, side walls 5 and a roof 6, all of which parts are smooth on the inside. On the outside these walls are reinforced by bars 7.

The side walls may be provided with a covered opening 8 through which the operation inside of the tank can be observed by opening the cover located over said opening. The front wall 9 is stationary, but on the inner side of it there can be provided another wall or movable partition, not shown in the drawing, but which is arranged vertically and can be moved horizontally inside of the tank in the manner of a piston to move the waste material out of the tank through its open rear end. The movable wall or partition can also be used to compress the material inside of the tank when necessary.

In order to open the rear end of the tank there is provided a swingable rear section, such section being defined by the points indicated at 10, 11, 12, 13, 14 and 15. This swingable rear section is adapted to be raised upwardly on hinges 10 fixed to the roof, by means of a hydraulic mechanism not shown in the drawings. The raising movement of the swingable rear section is thus on an axis which extends transversely to the body of the vehicle. Thus, on the raising of the rear section, the rear end of the body or tank is uncovered and the rubbish in the tank can be discharged through the open rear end by pushing the movable rear wall in the manner of a piston toward the rear open end of the body or tank.

When the swingable rear section is in its closed position as shown in FIG. 1, it can be maintained or locked in such position by means of any suitable locking devices not shown in the drawings.

In the closed position of the rear portion the side walls 16 thereof constitute extensions of the side walls 5 of the rubbish tank and similarly the plate which forms the roof of the swingable rear section forms an extension of the plate 6 which forms the roof of the rubbish tank. The bottom plate 18 of the swingable rear section, which curves uniformly in a rearwardly and upwardly direction to the point 13, is an extension of the bottom plate 4 of the rubbish tank.

In FIG. 1 the part which is defined by the points 13, 14 and 15 constitutes the so-called dipper or scoop, is able to swing rearwardly and downwardly about the axis extending through the point 13. At the point 13 hinges are provided for the purpose. The dipper or scoop 19 can thus be swung to the position 19a indicated in dotted lines in FIG. 1 by means of hydraulic power devices of known kind not shown in the drawing. Other hydraulic devices may also be connected to the dipper, by means of which its position vertically can be altered such as from the position 19a to the lowered position 19b whereupon the lowermost part of the dipper will touch the ground. The side walls of the dipper, when it is in its elevated position are extensions of the side walls 16 of the swingable rear section. In addition to the side walls 19, the dipper has a rear wall 20 and a bottom 21. Otherwise it is open so that it can be loaded with rubbish while it is in the position 19a or 19b, or for example, separate waste containers or cans can be placed on its bottom 21 and secured on the dipper as desired. When the dipper is then swung from the position 19a to a position 19 the rubbish drops out of it, or from the open top waste containers mounted on it, into the swingable rear section of the rubbish tank to reach the bottom 18 thereof.

The swingable rear section of the rubbish tank has a front wall which consists of a plate extending perpendicularly to the plane of FIG. 1, connected to the side walls 16 and extending from the front edge at 10 of the plate 17 as a plane surface down to the point 11, making at this point a slight bend and continuing as a plane surface toward the front edge 12 of the bottom 18 of the swingable rear section. This front wall however, does not reach the bottom plate 18 at all points, so that an opening of a suitable size remains between the swingable rear section and the main rubbish tank, through which opening rubbish can be pushed from the rear section into the main rubbish tank by means of devices adapted for the purpose.

When the rubbish tank has become filled and this cargo has been driven to the dumping ground or incinerator, it is only necessary to raise the swingable rear section of the tank on the hinges 10, whereupon the rear end of the tank will be open and the rubbish can then be pushed out of the tank by forcing the auxiliary front wall toward the open rear end in the manner of a piston.

Figure 2:
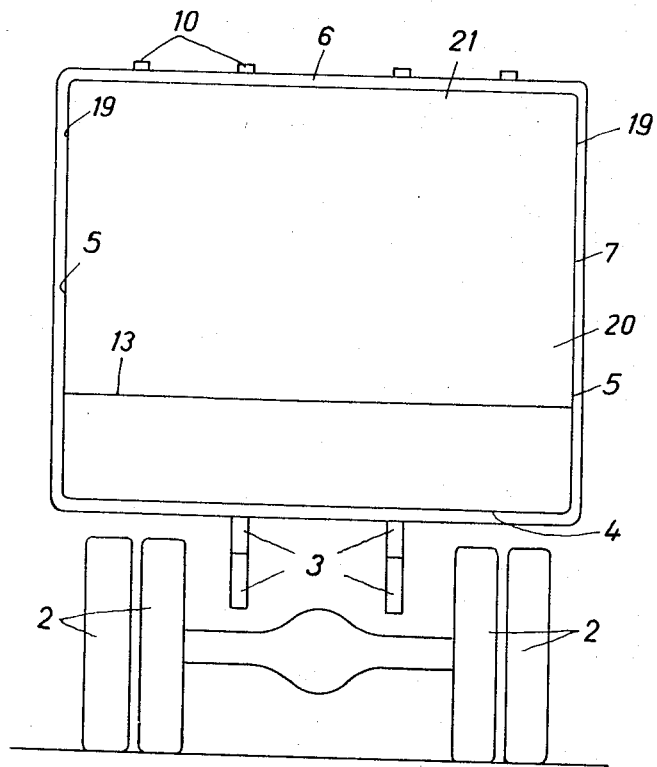
FIG. 2 is a rear view of the same.

The dipper or scoop shown in FIGS. 3 and 4 consists of an arrangement which differs somewhat from that shown in FIGS. 1 and 2. In the lowered position the back 31 and the bottom 32 of the dipper form an angle of slightly more than 90 degrees, while the corner is not rounded off but is angularly shaped. The back wall 31 and the bottom plate 32 are fixed by welding to supporting U-shaped bars 33. The hinge location is also reinforced by similar bars 34. The sides of the dipper are made up of substantially triangular plates 35. The loading dipper can be turned on the hinge 13 in the manner described below.

Arms 37 are hingedly connected to the U-shaped bars at the points 36, to which arms shallow cups 39 are hinged at the points 38. The arms 37 are able to turn perpendicularly to their flat sides and the cups 39 are able to turn in the same plane as the arms.

A compressible packing or contact ring 40 composed of rubber, sponge rubber, or other dense and flexible material of similar characteristics is provided on the oval edge surface of the low side walls of the cups 39, and which packing is fitted tightly into a receptive depression. The packing thus circles the edge 39 in the manner of a closed ring. When the suction cup 39 is placed, for example, against the smooth or almost smooth wall of a waste can and vacuum is exerted between the suction cup and the waste can or other object by means of a tube 41, which is tightly connected to the cup, the pressure of the outside atmosphere urges the suction cup against the surface of the can. When the suction cup thus becomes strongly attached to the wall of the waste can in the above manner, the can may be lifted by means of the suction cup and maintained in place on the dipper or scoop of the waste-carrying vehicle and held thereon during the dumping procedure. One suction cup is usually enough to securely attach a waste can to the dipper, provided that the can is at the same time supported at some other point, for example by the U-shaped bar or other projecting part of the dipper. Also when the suction cup is strongly connected to the dipper the waste can can be sufficiently attached by only one suction cup.

The cup-supporting arms and the cups can be locked to each other and to the dipper by means of devices which are not disclosed in the drawings.

In FIGS. 1 and 2 a waste can 40 is shown in dotted lines and which is engaged by means of suction cups from both sides and from behind. In such a case two suction cups are usually enough to fix the waste can securely to the dipper, if the cups are situated on the opposite sides of the waste can. The use of a third suction cup however, assures the firm attachment of the can to the dipper.

The suction cups, including their supporting arms are easily switched from one point on the dipper to another when desired or required. The dipper is therefore provided with holes or other apertures for example, at the point 56, where the suction cup including its supporting arm can be mounted by means of a hinge bolt and a nut. In this way the dipper can be used for dischaging the contents of waste cans of different shapes and sizes. When no waste cans are placed on the dipper and the suction cups are disposed against the inside walls thereof, the rubbish can be loaded directly into the dipper for dumping thereby into the body or tank of the motor vehicle. Vacuum can be developed in the suction cups by means of the engine of the motor vehicle. Those parts of the engine which conduct gas to the cylinders are always under vacuum and they can be connected to the suction cups by means or piping, flexible tubes, or other conduits so that the vehicle engine provides vacuum within the suction cups. The engine is in operation during loading, in order to drive the compressor and to provide working power to the hydraulic devices and the hydraulic motor.

The tubing through which the suction is exerted is preferably connected to a suitable intermediate tank or tanks, in which the vacuum is obtained by the operation of the engine of the vehicle and which intermediate tank equalizes the pressure in the tubing and the suction cups during operation. The tank may be provided with a filter for catching any dust or other particles in the air being sucked from the cups, in order to protect the engine of the vehicle. Thus, the intermediate tank of suitable dimensions preserves the vacuum obained by suction, and is connected by means of pipes and flexible tubes to the suction cup 39, from which the air is sucked into the engine by way of the intermediate tank.

A three-way cock or valve may be used between the intermediate tank and the suction cups, which valve may consist of a cylindrical casing 42 having a cylindrical plug 43 inside of it which plug can be rotatively moved around its axis. In the position shown in FIG. 7 the air can be sucked from the suction cup 39 through the tube 44 and the channel in the three-way cock, and in the direction of the arrow, to the engine of the vehicle by way of the filter and the intermediate tank.

In FIG. 8 the tube 46 leading to the engine is closed. Thus, the operating motor increases the vacuum in the intermediate tank. As FIG. 8 indicates, the outside air has free passage to flow in the direction of the arrow through the three-way cock to the suction cup, so that the cup detaches itself from the can or other object.

In order that the three-way cock can be turned to suction position as shown in FIG. 7, before placing the cup against the object to be attached, and to insure that air is not needlessly being sucked through the suction cup, additional means may be provided. Such additional means are disclosed in FIGS. 9 and 10. In FIG. 9 the element defined by 49, 50 and 51 represents a section of a double-branched lever provided with a bend, which is able to turn in the plane of the figure in relation to the point 50. At the point 50 the lever is hingedly attached to the suction cup 39. A spring not shown in FIG. 9 tends to urge the plate-shaped end 49 of the lever toward the opening in the suction cup leading to the tube 41. When the end portion of the lever 49 presses against the opening and closes it, air is prevented from flowing to the tube and also to the intermediate tank and the engine. The end 51 of the lever in this position is situated somewhat below other parts of the suction cup. When the suction cup is placed against the can or other object, such as the wall 52 of the can, this surface pushes the end 51 upwardly and which pivots the lever 49, 50 and 51 so that the tube 41 is uncovered and the vacuum can be produced in the suction cup.

FIG. 10 shows a modification which differs slightly from that shown in FIG. 9. In FIG. 10 the tube 41 is connected to the suction cup 59 through a hollow block 52a. The hollow block 52a is cylindrical and consists of an enlargement of the tube 41. The block contains a coil spring 53 which urges a plate 54 against an opening at the bottom of the hollow block, thus closing the passage. As shown in FIG. 10, this opening is open and air can be sucked through the same into the tube 41. An arm 55 extends down from the plate 54 and presses against the supported objects such as the surface of a can, so that the opening above mentioned is kept open and vacuum can be sucked into the cup through the tube 41. When the suction cup is detached from the surface 52 of the can, the opening through the block 52a is closed, due to the force of the spring 53, and thus needless suction of the air through the suction cup is prevented.

The flexible tubes through which the air is sucked from the suction cup are not shown. These tubes may be arranged as a coil so that the dipper or scoop 31, 32 can be turned freely to different positions without causing disconnection or rupture of the tubes that extend from the suction cup. If desired, a strainer can be used in the suction cup, or elsewhere in the suction tubes or in or at the intermediate tank, in order to filter the air that is being sucked from the suction cup to the engine of the transport vehicle.

What I claim is:

1. A collection apparatus for waste comprising, a vehicle having a body or tank for receiving collected waste material, a hinged collection dipper at the rear of the vehicle body, said dipper being capable of being lowered to a position to receive waste or cans containing waste and which is thereafter dumped into the body when the dipper is swung upwardly on its hinge, at least one arm pivoted on the dipper, said arm carrying a suction cup for application against a waste can while the can is resting on the dipper and while it is swung by the dipper to dumping position, and means operative from the engine of the vehicle for producing suction in the suction cup.

2. A collection apparatus according to claim 1, wherein a plurality of suction cup-carrying arms are borne by the dipper, and means on the dipper by which the arms and the cups borne thereby can be located at various positions on the dipper.

3. A collection apparatus according to claim 1, wherein a valve arrangement is provided by which the exertion of suction through the suction cup is prevented while said cup is free from contact with an object.

4. A collection apparatus according to claim 3 and including means by which said valve is automatically closed by the separation of the cup from the object.

5. A collection apparatus comprising, an automotive vehicle having a body for receiving collected waste material, the body having a pivoted rear closure in the form of a scoop or dipper and into which trash or cans containing trash are adapted to be placed for dumping by the pivotal movement of the dipper, into the body, a plurality of movable arms carried by the dipper, each arm carrying a suction cup at its free end, said cups being adapted to suctionally engage one or more cans and hold them on the dipper during the swing of the dipper and the dumping of the contents of the cans into the vehicle body, means for producing suction in the suction cups through the operation of the motor of the vehicle, and means by which the cup-carrying arms can be shifted to various positions on the dipper for engagement with different parts of one or more cans on the dipper.

6. A collection apparatus for waste comprising, an automotive vehicle having a body, a pivoted scoop at the rear thereof for receiving waste or cans containing waste and by pivotal movement dumping the waste into the vehicle, and suction cups movably mounted on the scoop for suctionally engaging the cans and holding them on the scoop during the dumping procedure and during the swing of the scoop to dumping position.

7. A collection apparatus according to claim 6 wherein each cup has a valve located between it and a source for suction, and means for opening the valve when the cup is placed in contact with one of the cans and for closing the valve when the cup is removed from can contact.

References Cited by the Examiner

UNITED STATES PATENTS

| | | |
|---|---|---|
| 2,249,201 | 7/1941 | Ferguson. |
| 2,523,157 | 9/1950 | Somma _____ 294—64 X |
| 2,833,434 | 5/1958 | Stover et al. |
| 2,929,523 | 3/1960 | Cushman. |
| 2,950,829 | 8/1960 | McBean et al. |
| 3,227,481 | 1/1966 | Greskoff _____ 294—64 |

HUGO O. SCHULZ, *Primary Examiner.*